United States Patent [19]

Kitagawa et al.

[11] Patent Number: 4,628,296

[45] Date of Patent: Dec. 9, 1986

[54] LOAD CELL

[75] Inventors: Tohru Kitagawa; Koichiro Sakamoto, both of Mishima, Japan

[73] Assignee: Tokyo Electric Co., Ltd., Tokyo, Japan

[21] Appl. No.: 616,964

[22] Filed: Jun. 4, 1984

[30] Foreign Application Priority Data

Jun. 13, 1983 [JP] Japan .................... 58-105497

[51] Int. Cl.[4] .................... G01L 1/22
[52] U.S. Cl. .................... 338/3; 338/5; 73/862.67; 73/862.63; 73/764
[58] Field of Search .................... 338/2, 3, 4, 5, 6; 73/764, 765, 766, 862.67, 862.63; 177/211

[56] References Cited

U.S. PATENT DOCUMENTS

| 2,866,059 | 12/1958 | Laimins | 338/5 |
|---|---|---|---|
| 3,199,057 | 8/1965 | Gindes et al. | 338/5 |
| 3,697,918 | 10/1972 | Orth et al. | 338/3 |
| 4,299,130 | 11/1981 | Koneval | 73/766 |
| 4,320,664 | 3/1982 | Rehn et al. | 338/4 X |
| 4,325,048 | 4/1982 | Zaghi et al. | 338/3 |
| 4,376,929 | 3/1983 | Myhre | 338/4 |
| 4,432,247 | 2/1984 | Takeno et al. | 73/862.67 |
| 4,462,018 | 7/1984 | Yang et al. | 338/3 |

Primary Examiner—E. A. Goldberg
Assistant Examiner—M. M. Lateef
Attorney, Agent, or Firm—Frishauf, Holtz, Goodman & Woodward

[57] ABSTRACT

A load cell has four strain gauge resistors formed through an insulation layer on the beam body having a strain generating section, a conductive pattern for forming a bridge circuit by coupling the strain gauge resistors compensation resistance sections for compensating the bridge balance and span of the bridge circuit is provided. A section of the conductive pattern except the section coupled to the strain gauge resistors is disposed at a position sufficiently isolated from the strain gauge resistors.

18 Claims, 6 Drawing Figures

LOAD CELL

BACKGROUND OF THE INVENTION

The present invention relates to a load cell having strain gauge resistors and conductive layers formed by a thin film technique.

Heretofore, a load cell having strain gauge resistors formed through insulation layers on a beam body having a strain generating section and a conductive pattern for forming a bridge circuit by coupling these strain gauge resistors is known. In the load cell of this type, these strain gauge resistors and the conductive pattern are formed, for example, by vapor deposition, sputtering, or plating. In this case, in order to reduce the resistance of the conductive pattern, the conductive pattern is formed thick. Thus, when the conductive pattern is formed to have a strain therein, a stress is produced by this internal strain in the conductive pattern. This stress varies with age and is transmitted, for example, through an insulation layer to the strain guage resistors. As a result, the resistance values of the strain gauge resistors change. Correspondingly, bridge balance or span (the output voltage of the load cell) resultantly vary with age, thereby causing the performance of the load cell to be deteriorated.

In a load cell of this type, the conductive pattern is composed of a conductive layer selectively formed on a resistive layer for forming strain gauge resistors. Thus, when this load cell is used at different temperatures, the resistive layer under this conductive layer is contracted or expanded in response to the contraction or expansion of the conductive layer due to the difference of thermal expansion between the resistive layer and the conductive layer. A stress generated by this contraction or expansion is transmitted through the insulation layer to the strain gauge resistors, thereby altering the resistance value of the strain gauge resistors to cause the bridge balance or span to be varied.

SUMMARY OF THE INVENTION

It is an object of the present invention to provide a load cell in which a bridge balance or span is minimally affected by the influence of temperature change and aging variations.

The above object, is achieved by a load cell comprising a beam body having a strain generating section, a plurality of strain gauge resistors formed through an insulation layer on the beam body, a conductive pattern for forming a bridge circuit by coupling these strain gauge resistors, a plurality of compensation resistance sections for compensating the bridge balance and span of the bridge circuit, wherein a section other than the section coupled to the strain gauge resistors of the conductive pattern is disposed at a position sufficiently isolated from these strain gauge resistors.

In the present invention, since most of the conductive pattern is sufficiently isolated from the strain gauge resistors, the aging stress and thermal stress due to this conductive pattern are not substantially transmitted to the strain gauge resistors, but absorbed by the insulation layer so as not to affect the influence thereof on the bridge balance and span.

DETAILED DESCRIPTION OF THE PREFERRED EMBODIMENTS

Figure 1:
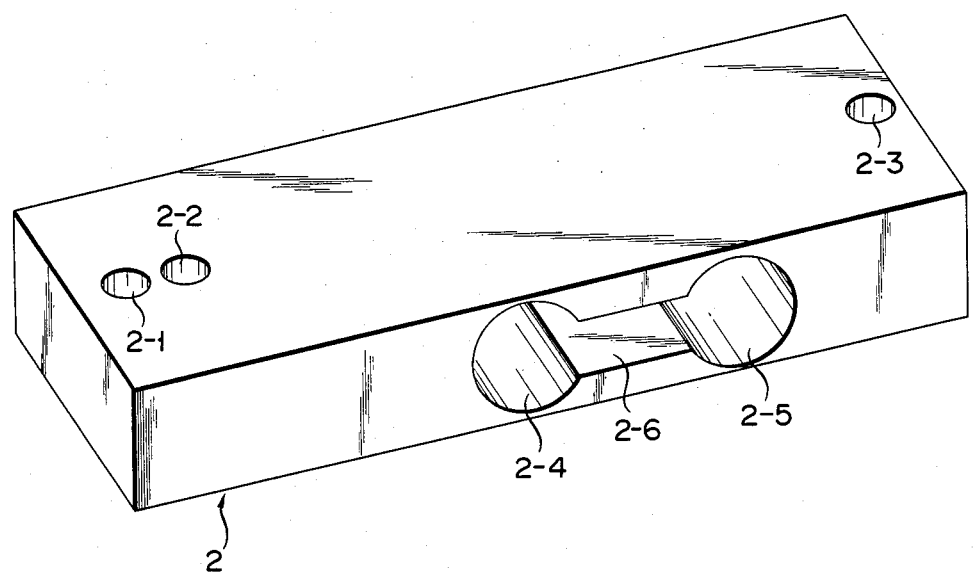
FIG. 1 is a perspective view of a beam body used for forming a load cell according to an embodiment of the present invention.

FIG. 1 shows a beam body 2 used for forming a load cell according to an embodiment of the present invention. This beam body 2 is obtained, for example, by cutting a stainless steel (SUS 630) or duralumin (A2014, A2024 or A2218). The beam body 2 has two through holes 2-1 and 2-2 formed to receive clamping bolts at a stationary end, and a through hole 2-3 formed to receive a supporting clamp (not shown) for supporting a weighing tray at a movable end. Further, the beam body 2 has two lateral through holes 2-4 and 2-5 formed to extend laterally, and a coupling hole 26 for coupling the holes 2-4 and 2-5. Those portions of the beam body 2 which correspond to the top portions of the holes 2-4 and 2-5 form a strain generating section.

Figure 2:
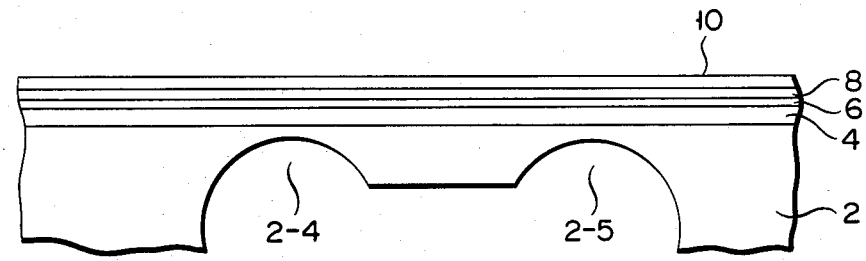
FIG. 2 is a fragmentary expanded front view of the FIG. 1 embodiment showing the aarea of the load cell which is formed with a laminate of insulating, resistive and conductive layers on the beam body.

When a strain sensor is formed on this beam body 2, an insulation film 4 having, for example, a thickness of 4 $\mu$m is first formed of an insulation material formed of an inorganic material such as a $SiO_2$ or an organic material such as polyimide resin on the beam body 2 as shown in FIG. 2. Then, a resistive layer 6 formed, for example, of a material such as NiCrSi which is used for forming strain gauge resistors and bridge balance correcting resistor and is hardly affected in electric characteristics by the temperature change is formed by sputtering, depositing in a thickness, for example, of 0.1 $\mu$m, on the film 4. A resistive layer 8 used to form a compensation resistor for compensating the variations of Young's modulus of the beam body 2 due to the temperature change and of the bridge balance due to the temperature change, is formed on the resistive layer 6. Further, a conductive layer 10 having relatively large thickness such as 2 $\mu$m for forming a conductive pattern is formed on the layer 8.

Figure 3:
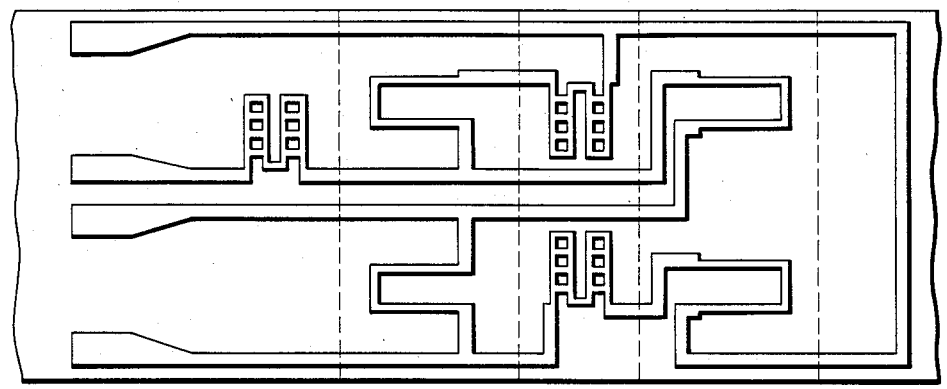
FIG. 3 is a plan view showing a pattern formed by selectively etching the laminate of resistive and conductive layers in the load cell structure shown in FIG. 2.

Then, a laminate of layers 6, 8 and 10 is selectively removed by photoetching, to form a pattern which includes the regions of strain gauge resistors, bridge balance correcting resistor, span temperature compensating resistor, bridge balance temperature compensating resistor, terminal sections and interconnecting sections as shown in FIG. 3.

Figure 4:
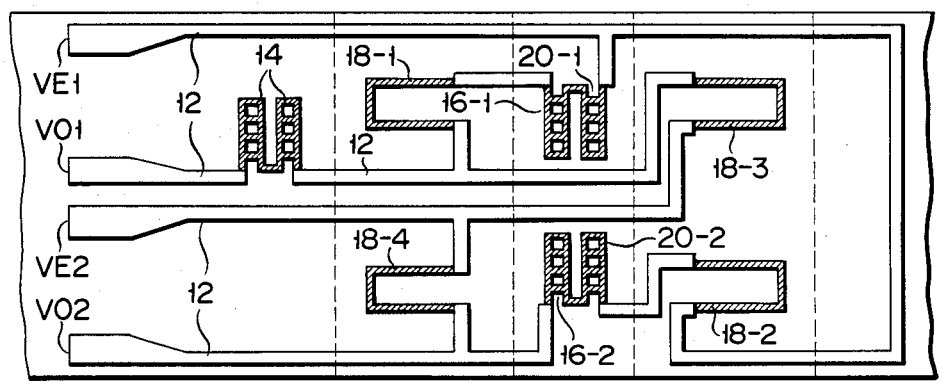
FIG. 4 is a plan view showing the resistive and conductive layers of the pattern obtained by removing the conductive layer in the section forming the resistors in the pattern obtained in FIG. 3.

Subsequently, as shown by hatched portion in FIG. 4, the conductive layer 10 in the regions of the strain gauge resistors, bridge balance correcting resistor, span temperature compensating resistor and bridge balance temperature compensating resistor is removed by etching. The span temperature compensating resistor 14 and the bridge balance temperature compensating resistors 16-1 and 16-2 are formed of the resistive layer 8 thus exposed, and power source terminals VE1 and VE2, output terminals VO1 and VO2, and interconnection sections 12 are formed of the remaining conductive layer 10. Further, the resistive layer 8 in the regions of the strain gauge resistors and the bridge balance correcting resistor is subsequently removed by etching, and the resistive layer 6 is exposed. Strain gauge resistors 18-1 to 18-4 and bridge balance compensating resistors 20-1 and 20-2 are formed of the resistive layer 6 thus exposed.

In order to provide relatively large resistance values in the strain gauge resistors 18-1 to 18-4, the resistive layer 6 is formed in sufficiently reduced thickness such as, for example, 0.1 $\mu$m, and in order to sufficiently reduce the resistance value of the interconnection section 12, the conductive layer 10 is formed in relatively large thickness of, for example, 2 $\mu$m.

Moreover, the span temperature compensating resistor 14, bridge balance temperature compensating resistors 16-1 and 16-2, and bridge balance compensating resistors 20-1 and 20-2 are disposed at the position where the beam body 2 is not substantially deformed when a load is applied to the load cell. Therefore, when a load is applied to the load cell, an expansion stress is applied to the strain gauge resistors 18-1 and 18-4, and a compression stress is applied to the strain gauge resistors 18-2 and 18-3, but no stress is applied to the other resistors.

Figure 5:
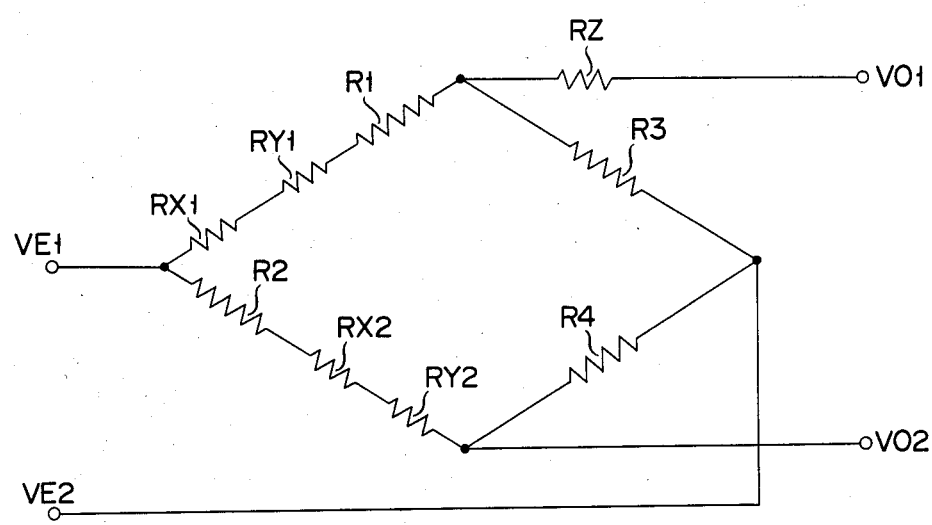
FIG. 5 is an equivalent circuit of the load cell obtained by selectively etching the resistive layer in FIG. 4.

FIG. 5 shows an equivalent circuit of the load cell thus obtained. In this equivalent circuit, resistors R1 to R4 respectively correspond to the strain gauge resistors 18-1 to 18-4, resistors RX1 and RX2 respectively correspond to the bridge balance compensating resistors 20-1 and 20-2, resistors RY1 and RY2 respectively correspond to the bridge balance temperature compensating resistors 16-1 and 16-2, and a resistor RZ corresponds to the span temperature compensating resistor 14.

The condition for maintaining the bridge circuit shown in FIG. 5 in a balanced state is $R1/R2=R3/R4$ when the resistors RX1, RX2, RY1 and RY2 are ignored. As shown in FIG. 4, the interconnection sections 12 are formed separately from these strain gauge resistors 18-1 to 18-4 to surround the strain gauge resistors 18-1 to 18-4, and the influence of the aging stress and thermal stress in these interconnection sections 12 on the resistances of the strain gauge resistors 18-1 to 18-4 is suppressed to the minimum value. Further, these interconnection sections 12 include the conductive layer formed to longitudinally extend on both ends of the beam body, and the strain gauge resistors 18-1 to 18-4 are respectively disposed at the equal interval from the corresponding conductive layers. Thus, the quantities of variation in the resistances of these strain gauge resistors 18-1 to 18-4 by the aging stress and thermal stress in the interconnection sections 12 become equal to each other, so that the balance condition of the bridge circuit is maintained, with the result that aging changes in the bridge balance and span do not occur nor variation occurs in response to the temperature change.

Figure 6:
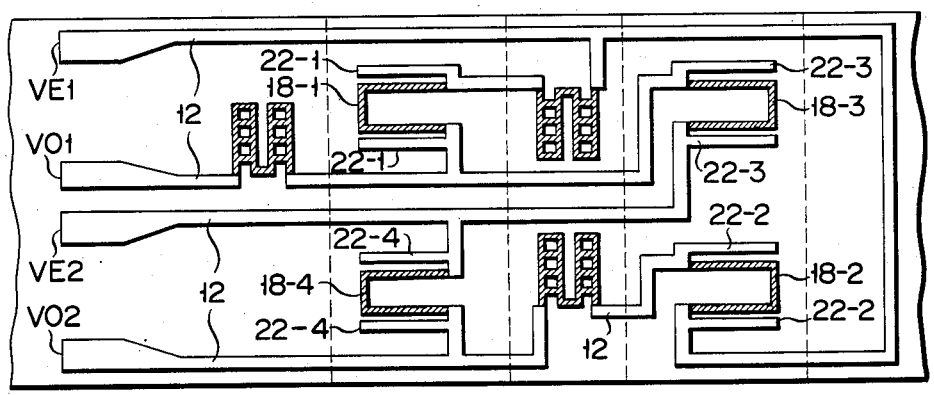
FIG. 6 is a plan view showing the section of a load cell according to another embodiment of the present invention.

FIG. 6 shows a load cell according to another embodiment of the present invention. This load cell is constructed substantially in the same manner as that shown in FIG. 4 except for having stress generating sections 22-1 to 22-4 formed similarly to the interconnection sections 12 which extend in parallel with each other in the vicinity of strain gauge resistors 18-1 to 18-4. Each of the stress generating sections is formed of a laminate of resistive layers and conductive layer formed of the same material as the resistive layers 6 and 8 and conductive layer 10 on an insulation layer 4. The dimensions of the stress generating sections 22-1 and 22-2 are empirically determined so that the aging stresses and thermal stress applied by the stress generating sections to the strain gauge resistors 18-1 to 18-4 are proportional to one another, e.g., these stress generating sections 22-1 are formed substantially the same as those of the stress generating sections 22-2, and the distance between the stress generating sections 22-1 and the strain gauge resistor 18-1 is set substantially equal to the distance between the stress generating sections 22-2 and the strain gauge resistor 18-2. Similarly, the sizes of the stress generating sections 22-3 and 22-4 are set equal so that the aging and thermal stresses applied by the stress generating sections 22-3 and 22-4 to the strain gauge resistors 18-3 and 18-4 are proportional to one another.

The aging and thermal stresses of the stress generating sections 22-1 to 22-4 applied to the strain gauge resistors 18-1 to 18-4 are much larger than those of the interconnection sections 12 applied to the strain gauge resistors 18-1 to 18-4, and the bridge balance can be accordingly maintained substantially constant irrespective of the aging and thermal stresses.

The present invention has been described with respect to the embodiments. The present invention is not limited to the particular embodiments. For example, the bridge balance can also be maintained by respectively setting the dimensions of the stress generating sections 22-1 and 22-4 substantially equal to those of the stress generating sections 22-3 and 22-2, equalizing the stresses of the stress generating sections 22-1 and 22-3 with respect to the strain gauge resistors 18-1 and 18-3, and equalizing the stresses of the stress generating sections 22-2 and 22-4 with respect to the strain gauge resistors 18-2 and 18-4.

What is claimed is:
1. A load cell comprising:
   a beam body having at least one strain generating section with a substantially flat, straight-edged, multi-sided surface section;
   a plurality of strain gauge resistors formed on and insulated from said beam body, each strain gauge having one portion closest to an associated edge of said surface;
   a conductive pattern including a conductive layer formed along at least a portion of the periphery of said beam body and coupling said strain gauge resistors to form a bridge circuit, said conductive layer being interposed between said one portion of each of said strain gauge resistors and its associated surface edge;
   each of said strain guage resistors having its said one portion spaced at a preset distance from the portion of the interposed conductive layer to which it is closest, said present distance for one strain gauge resistor being equal to the preset distance for at least another of said strain gauge resistors.

2. A load cell according to claim 1, wherein said plurality of strain gauge resistors includes four resistors.

3. A load cell according to claim 2, wherein the conductive layer includes first and second conductive layers with each being formed along an edge of said beam body, two of said resistors having said one portion thereof extending parallel to and spaced from the first conductive layer by a first distance, and the remaining two of said resistors having said portion thereof extending parallel to and spaced from the second conductive layer by a second distance.

4. A load cell according to claim 3, wherein said first and second distances are equal.

5. A load cell according to claim 4, further including a plurality of compensation resistances for compensating a bridge balance and span of said bridge circuit.

6. A load cell according to claim 5, wherein the compensation resistances are disposed on said beam body at positions where the beam body is not substantially deformed when a load is applied thereto.

7. A load cell according to claim 6, wherein the conductive layer, strain gauge resistors and compensating resistances are part of a thin film formed on said beam body.

8. A load cell according to claim 7, wherein said strain gauge resistors and compensation resistances are formed on said beam body by a deposition technique.

9. A load cell according to claim 1, wherein said preset distance is the same for all the strain gauge resistors.

10. A load cell according to claim 2, further comprising first to fourth stress generating sections which are formed of the same material as said conductive pattern, each of said first and second stress generating sections being separated from the portion of a corresponding one of said first and second strain gauge resistors by a predetermined distance smaller than said preset distance and each of said third and fourth stress generating sections being separated from the portion of a corresponding one of said third and fourth strain gauge resistors by said predetermined distance.

11. A load cell according to claim 1, further including a stress generating section placed alongside and parallel to at least one of said strain gauge resistors at a distance less than said preset distance.

12. A load cell according to claim 11, wherein the stress generating section is formed of the same material as the conductive pattern.

13. A load cell according to claim 2, further comprising first to fourth stress generating sections which are located adjacent to said first to fourth strain gauge resistors.

14. A load cell according to claim 13, wherein each of said stress generating sections is formed to have the same dimensions and at the same distance from a corresponding one of said first to fourth strain gauge resistors.

15. A load cell according to claim 13, wherein said stress generating sections are formed of the same material as said conductive pattern and formed integrally with said conductive pattern.

16. A load cell according to claim 1, wherein said one portion of each strain gauge resistor is parallel to the interposed conductive layer.

17. A load cell according to claim 9, wherein said one portion of each strain gauge resistor is parallel to the interposed conductive layer.

18. A load cell according to claim 10, wherein said stress generating sections have the same dimensions as said conductive pattern.

* * * * *